(12) United States Patent
Nishikawa

(10) Patent No.: US 10,167,047 B2
(45) Date of Patent: Jan. 1, 2019

(54) BICYCLE DRIVE UNIT

(71) Applicant: Shimano Inc., Sakai, Osaka (JP)

(72) Inventor: Yusuke Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 586 days.

(21) Appl. No.: 14/695,067

(22) Filed: Apr. 24, 2015

(65) Prior Publication Data

US 2015/0336631 A1   Nov. 26, 2015

(30) Foreign Application Priority Data

May 21, 2014  (JP) .................. 2014-105684

(51) Int. Cl.
| | | |
|---|---|---|
| *B62M 6/40* | (2010.01) | |
| *B62M 6/45* | (2010.01) | |
| *B62M 6/55* | (2010.01) | |
| *B62K 19/34* | (2006.01) | |
| *H02K 5/02* | (2006.01) | |

(52) U.S. Cl.
CPC .............. *B62M 6/40* (2013.01); *B62K 19/34* (2013.01); *B62M 6/45* (2013.01); *B62M 6/55* (2013.01); *H02K 5/02* (2013.01); *Y10T 74/19028* (2015.01); *Y10T 74/2164* (2015.01)

(58) Field of Classification Search
CPC ............ B62M 6/40; B62M 6/45; B62M 6/50; B62M 6/55; B62K 19/34; H02K 5/02; H02K 5/04
See application file for complete search history.

(56) References Cited

U.S. PATENT DOCUMENTS

| | | | | |
|---|---|---|---|---|
| 4,384,226 A | * | 5/1983 | Sato | H02K 5/15 310/216.115 |
| 4,406,504 A | * | 9/1983 | Coenen | B62K 19/34 384/458 |
| 4,651,590 A | * | 3/1987 | Thun | B62K 19/34 384/458 |
| 5,118,205 A | * | 6/1992 | Hoffmann | B62K 19/34 384/458 |
| 5,758,736 A | * | 6/1998 | Yamauchi | B62M 6/45 180/206.4 |
| 5,845,727 A | * | 12/1998 | Miyazawa | B62M 6/55 180/206.4 |

(Continued)

FOREIGN PATENT DOCUMENTS

| | | | |
|---|---|---|---|
| DE | 20 2012 012 722 U1 | 10/2013 | |
| DE | 102012213897 | * | 2/2014 |

(Continued)

*Primary Examiner* — Joseph M Rocca
*Assistant Examiner* — Maurice L Williams
(74) *Attorney, Agent, or Firm* — Global IP Counselors, LLP

(57) ABSTRACT

A bicycle drive unit is basically provided with a crankshaft and a housing. The housing includes a synthetic resin first portion, a synthetic resin second portion and a metallic third portion. The synthetic resin first portion supports a first end of the crankshaft. The synthetic resin second portion supports a second end of the crankshaft. The metallic third portion is disposed in between the synthetic resin first portion and the synthetic resin second portion. The metallic third portion defines an internal space of the housing along with the synthetic resin first portion and the synthetic resin second portion.

11 Claims, 2 Drawing Sheets

(56) References Cited

U.S. PATENT DOCUMENTS

| | | | | |
|---|---|---|---|---|
| 5,909,781 | A * | 6/1999 | Yonekawa | B62M 6/55 180/206.4 |
| 6,073,717 | A * | 6/2000 | Yamamoto | B62M 6/55 180/206.4 |
| 8,708,084 | B2 * | 4/2014 | Kuroki | B62M 6/50 180/205.1 |
| 9,533,736 | B2 * | 1/2017 | Watarai | B62M 9/135 |
| 2002/0046891 | A1 * | 4/2002 | Honda | B60L 11/1803 180/220 |
| 2003/0193263 | A1 * | 10/2003 | Maslov | B62M 6/40 310/254.1 |
| 2005/0172756 | A1 * | 8/2005 | Matsumoto | B62M 6/55 74/606 R |
| 2007/0207631 | A1 * | 9/2007 | Meggiolan | B62M 3/003 439/55 |
| 2011/0168472 | A1 * | 7/2011 | Li | B60L 11/1801 180/206.4 |
| 2011/0187215 | A1 * | 8/2011 | Sahara | H02K 23/04 310/89 |
| 2013/0064488 | A1 * | 3/2013 | Shiraishi | B62K 19/34 384/545 |
| 2013/0300222 | A1 * | 11/2013 | Nakano | H02K 11/0084 310/43 |
| 2014/0121049 | A1 * | 5/2014 | Nishikawa | B62M 6/55 474/148 |
| 2014/0159517 | A1 * | 6/2014 | Furuya | H02K 5/02 310/43 |
| 2014/0210318 | A1 * | 7/2014 | Yao | H02K 7/14 310/67 R |
| 2014/0218143 | A1 * | 8/2014 | Gruden | H02K 26/00 335/229 |
| 2014/0221151 | A1 * | 8/2014 | Hino | B62M 6/55 477/5 |
| 2014/0354087 | A1 * | 12/2014 | Kato | H02K 11/046 310/43 |
| 2014/0368094 | A1 * | 12/2014 | Kobayashi | H02K 5/04 310/68 B |
| 2015/0008059 | A1 * | 1/2015 | Douglas | B62K 25/32 180/206.1 |
| 2015/0276042 | A1 * | 10/2015 | Nishikawa | F16H 57/0416 74/606 A |
| 2016/0329781 | A1 * | 11/2016 | Onishi | H02K 5/04 |

FOREIGN PATENT DOCUMENTS

| | | |
|---|---|---|
| DE | 20 2014 100 111 U1 | 5/2014 |
| DE | 10 2014 000 898 A1 | 8/2014 |
| JP | 2000-142539 A | 5/2000 |
| JP | 2001-88768 A | 4/2001 |
| JP | 2001-180565 A | 7/2001 |
| JP | 2003-104264 A | 4/2003 |
| JP | 2003-156107 A | 5/2003 |
| JP | 2003-158855 A | 5/2003 |
| JP | 2003-163476 A | 6/2003 |
| JP | 2003-219603 A | 7/2003 |
| JP | 2005-239139 A | 9/2005 |
| JP | 2007176354 A * | 7/2007 |
| JP | 2014-19181 A | 2/2014 |
| JP | 2014-51193 A | 3/2014 |

* cited by examiner

BICYCLE DRIVE UNIT

CROSS-REFERENCE TO RELATED APPLICATIONS

This application claims priority to Japanese Patent Application No. 2014-105684, filed on May 21, 2014. The entire disclosure of Japanese Patent Application No. 2014-105684 is hereby incorporated herein by reference.

BACKGROUND

Field of the Invention

This invention generally relates to a bicycle drive unit. More specifically, the present invention relates to a bicycle drive unit that aids in providing a drive force through the use of a motor in addition to manual drive force for assisting riding a bicycle.

Background Information

Electrically assisted bicycles are becoming more widely used that have an electric motor for providing a drive force to assist a rider's pedaling in driving the bicycle. A conventional electrically assisted bicycle typically has a bicycle drive unit that has a casing. The casing of the bicycle drive unit is either molded from synthetic resin (see, Japanese Laid-Open Patent Publication No. 2001-180565) or a metallic material. The bicycle drive unit typically has a drive mechanism, such as an electric motor, that is housed inside of the casing.

SUMMARY

In a conventional drive unit, when a metallic casing is used, the weight of the casing is larger than when a synthetic resin (non-metallic) casing is used. On the other hand, when a synthetic resin casing is used, while a synthetic resin casing is lighter than a metallic casing, the heat generated from the motor, etc. is more difficult to dissipate from the casing.

The present invention was made in light of problems like those described the above. One object of the present invention is to achieve a reduction in the weight of a bicycle drive unit, while at the same time facilitate the dissipation of the heat generated by the bicycle drive unit.

In view of the state of the known technology and in accordance with a first aspect of the present disclosure, a bicycle drive unit is provided for assisting riding a bicycle. The bicycle drive unit basically comprises a crankshaft and a housing. The housing includes a synthetic resin first portion, a synthetic resin second portion and a metallic third portion. The synthetic resin first portion supports a first end of the crankshaft. The synthetic resin second portion supports a second end of the crankshaft. The metallic third portion is disposed in between the synthetic resin first portion and the synthetic resin second portion. The metallic third portion defines an internal space of the housing along with the synthetic resin first portion and the synthetic resin second portion.

In the housing of the bicycle drive unit of the present invention, the metallic third portion is disposed between the synthetic resin first and second portions. In this way, since the third portion is metallic, heat dissipation can be improved in the housing of the bicycle drive unit of the present invention when compared to conventional technology.

In accordance with a second aspect of the present invention, the bicycle drive unit according to the first aspect further comprises an output unit that is coaxially disposed on the second end of the crankshaft and operatively coupled to the crankshaft to receive rotation of the crankshaft. The synthetic resin first portion includes a first axle bearing portion that rotatably supports the first end of the crankshaft. The synthetic resin second portion includes a second axle bearing portion that rotatably supports the output unit.

In accordance with a third aspect of the present invention, the bicycle drive unit according to the second aspect further comprises an electric motor that is disposed in the internal space of the housing, and operatively coupled to the output unit to transmit rotation of the electric motor to the output unit.

In accordance with a fourth aspect of the present invention, the bicycle drive unit according to the third aspect further comprises a speed reduction mechanism that is disposed in the internal space of the housing, and that is operatively coupled between the electric motor and the output unit to reduce an output of the electric motor to the output unit. In this case, the output of the electric motor can be appropriately reduced by the speed reduction mechanism that is disposed in the internal space of the housing.

In accordance with a fifth aspect of the present invention, the bicycle drive unit according to the third aspect or the fourth aspect further comprises a control board that is disposed in the internal space of the housing, and that is electrically coupled to the electric motor. In this case, the output of the electric motor can be appropriately controlled by the control board that is disposed in the internal space of the housing.

In accordance with a sixth aspect of the present invention, the bicycle drive unit according to the fifth aspect is configured so that the control board is mounted on the metallic third portion. In this case, by mounting the control board to the metallic third portion, a heat dissipation effect can be expected. That is, the increase in the temperature of the control board can be suppressed.

In accordance with a seventh aspect of the present invention, the bicycle drive unit according to the fifth aspect or the sixth aspect further comprises a transmission mechanism disposed in the internal space of the housing between the control board and the electric motor, and operatively coupling the crankshaft to the output unit to define a transmission path between the crankshaft and the output unit. In this case, the control board and the electric motor, which are the heat sources, are disposed in the internal space of the housing in a state that separates them from each other via the transmission mechanism. With this, the temperature in the housing can be dispersed. Also, by disposing the transmission mechanism in the space between the control board and the electric motor, the heat of the electric motor can be suppressed from being directly transmitted to the control board.

In accordance with an eighth aspect of the present invention, the bicycle drive unit according to the seventh aspect is configured so that the transmission mechanism is supported on the synthetic resin first portion and the synthetic resin second portion.

In accordance with a ninth aspect of the present invention, the bicycle drive unit according to in any one of the first to eighth aspects is configured so that the metallic third portion comprises an attaching portion that is configured to be attached to a frame of the bicycle. In this case, since the metallic third portion with a higher rigidity than the synthetic resin first and second portions comprises an attaching portion, the housing can be reliably attached to the frame of the bicycle.

In accordance with a tenth aspect of the present invention, the bicycle drive unit according to in any one of the first to ninth aspects is configured so that each of the synthetic resin first portion and the synthetic resin second portion comprises polyamide.

In accordance with an eleventh aspect of the present invention, the bicycle drive unit according to in any one of the first to tenth aspects is configured so that each of the synthetic resin first portion and the synthetic resin second portion comprises glass fiber.

In accordance with a twelfth aspect of the present invention, the bicycle drive unit according to in any one of the first to eleventh aspects is configured so that the metallic third portion is an aluminum alloy.

According to the present invention, a reduction in the weight of a bicycle drive unit can be achieved, while at the same time improving the heat dissipated of the heat that is generated by the bicycle drive unit.

Also other objects, features, aspects and advantages of the disclosed bicycle drive unit will become apparent to those skilled in the art from the following detailed description, which, taken in conjunction with the annexed drawings, discloses one embodiment of the bicycle drive unit.

BRIEF DESCRIPTION OF THE DRAWINGS

Referring now to the attached drawings which for a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
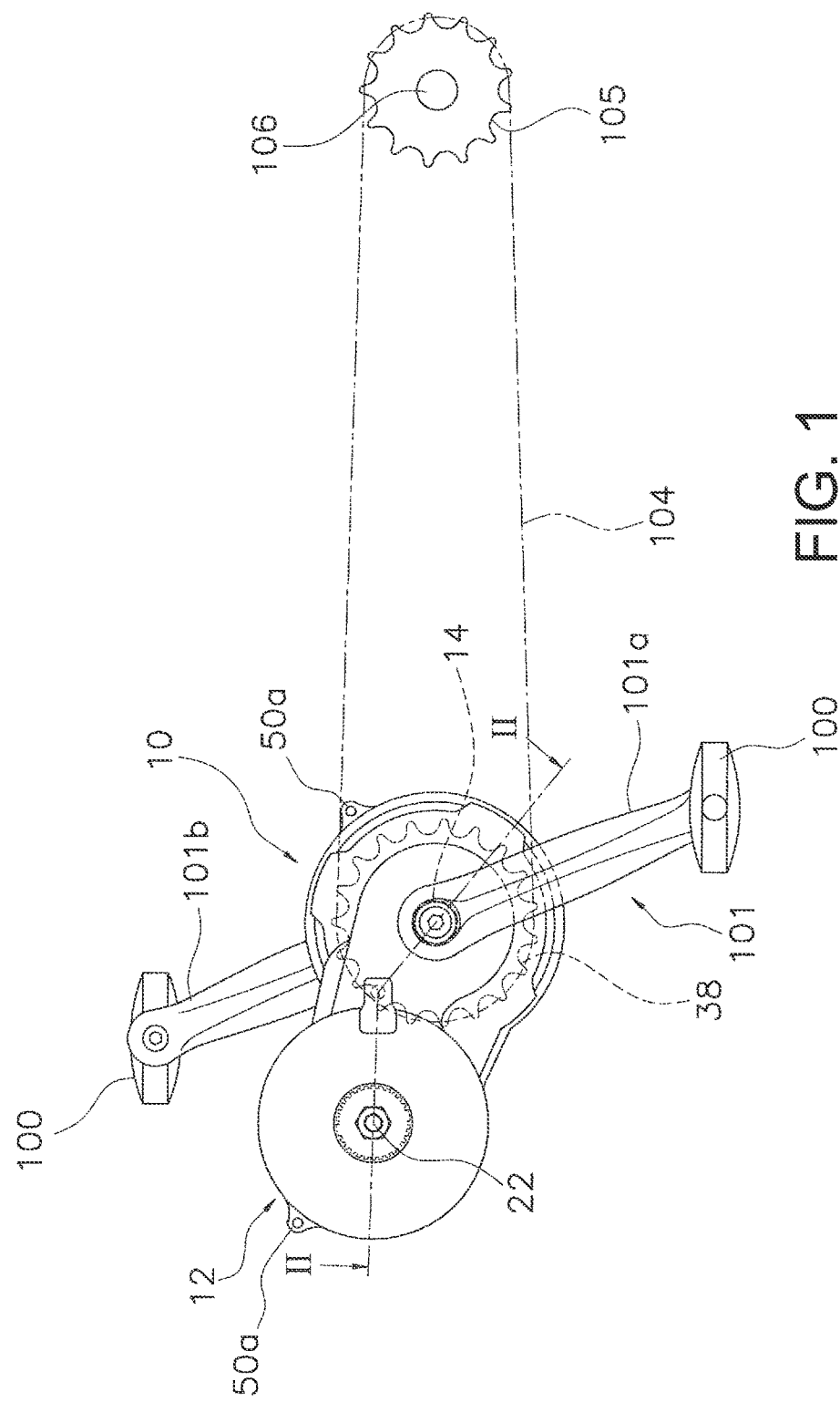
FIG. 1 is a left side elevational view of a drive train for an electrically assisted bicycle that is equipped with a bicycle drive unit in accordance with one illustrated embodiment.

Referring initially to FIG. 1, a left side elevational view of a drive train is illustrated for an electrically assisted bicycle that is equipped with a bicycle drive unit 10 in accordance with one illustrated embodiment. In FIG. 1, only the parts related to the bicycle drive unit are shown. The drive unit 10 comprises, among other things, a housing 12 and a crankshaft 14. The crankshaft 14 is driven by a pair of pedals 100 that is mounted to a crank 101. Thus, the drive unit 10 is disposed in a vicinity of the crank 101. The crank 101 comprises a first crank arm 101a that is mounted to a first end of the crankshaft 14 and a second crank arm 101b that is mounted to a second end of the crankshaft 14. As shown in FIG. 1, the drive unit 10 is a unit for assisting riding a bicycle. In particular, the drive unit 10 has an electric motor 30. Thus, the drive unit 10 is a unit that is able to assist the rider using a drive force penetrated by the electric motor 30. In this process, the drive unit 10 combines the motor output of the electric motor 30 with the manual drive force from the pedals 100 as the auxiliary power to assist riding. The drive unit 10 and a battery (not diagrammed) that drives the drive unit 10 are attached to the bicycle frame.

A front sprocket 38 is disposed on the crankshaft 14, and is rotated by the pedaling force acting on the pedals 100. A first chain 104 is engaged with the front sprocket 38 and a rear sprocket 105 mounted to a hub body 106 that is provided around the axle of the rear wheel. Thus, the electrically assisted bicycle transmits the pedaling force acting on the pedals 100 to the hub body 106 via the following transmission path. The transmission path is as follows: "the first crank arm 101a and the second crank arm 101b→the crankshaft 14→the drive unit 10→the front sprocket 38→the first chain 104→the rear sprocket 105."

Figure 2:
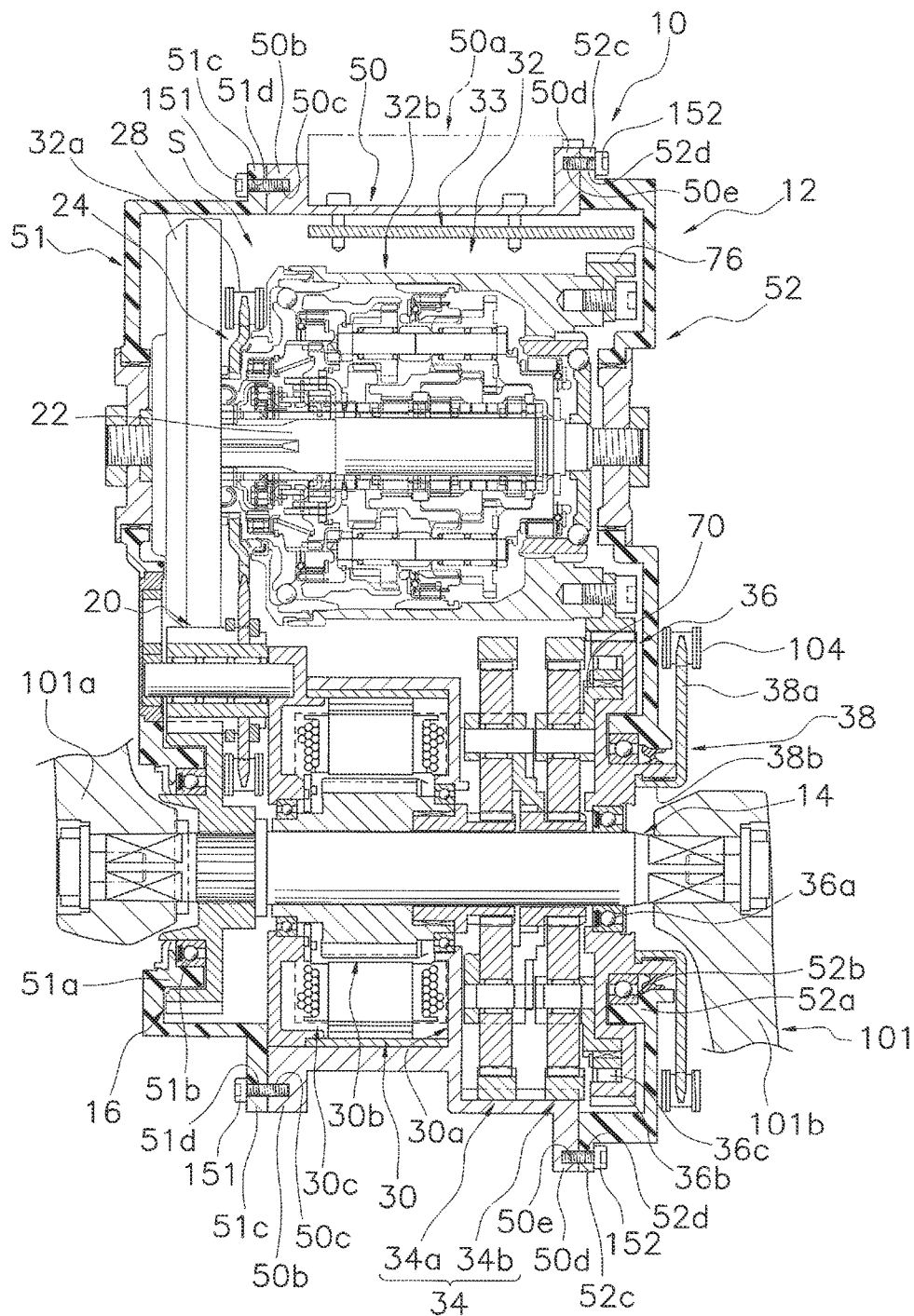
FIG. 2 is a cross-sectional view of the drive unit taken along section line II-II in FIG. 1.

As shown in FIG. 2, the drive unit 10 further comprises a control board 33, a transmission mechanism 32, a speed reduction mechanism 34 and a power transmission unit 36 (one example of an output unit). Additionally, the housing 12 comprises a second chain 28, a first rotation transmission member 16, a second rotation transmission member 20, a support shaft 22 and a third rotation transmission member 24.

As shown in FIG. 2, the housing 12 comprises a main body portion 50 (one example of a metallic third portion), a first cover portion 51 (one example of a synthetic resin first portion) and a second cover portion 52 (one example of a synthetic resin second portion). The main body portion 50 is attached to a bicycle frame. In particular, the main body portion 50 comprises an attaching portion 50a that can be attached to a bicycle frame. For example, the attaching portion 50a is integrally formed with the main body portion 50. The attaching portion 50a is attached in a vicinity of the connecting portion of the lower end portion of the seat tube of the frame and the rear end portion of the down tube of the frame, which are not shown, by a fixing member. The fixing member is, for example, a bolt. The attaching portion 50a can also be provided separately from the main body portion 50.

The main body portion 50 is metallic and is formed by, for example, an aluminum alloy. The main body portion 50 is disposed between the first cover portion 51 and the second cover portion 52. The main body portion 50 forms an internal space S along with the first cover portion 51 and the second cover portion 52. In particular, the main body portion 50 is essentially a hollow member that is open on both sides. The above-described internal space S is formed by attaching the first cover portion 51 and the second cover portion 52 to the opening of the main body portion 50.

The crankshaft 14, the electric motor 30, the control board 33, the transmission mechanism 32, the speed reduction mechanism 34, and the power transmission unit 36 are all disposed in the internal space S. Additionally, the second chain 28, the first rotation transmission member 16, the second rotation transmission member 20, the support shaft 22, and the third rotation transmission member 24 are all disposed in the internal space S. In this way, the housing 12 houses the configuration of the drive system except for the front sprocket 38.

The first cover portion 51 is made of synthetic resin. For example, the first cover portion 51 is formed of a synthetic resin comprising polyamide and/or glass fiber. The first cover portion 51 rotatably supports the crankshaft 14. The first cover portion 51 comprises a first hole portion 51a and a first axle bearing 51b (one example of a first axle bearing portion). The crankshaft 14 is inserted into the first hole portion 51a. A first rotation transmission member 16, which is described below, is disposed between the first hole portion 51a and the crankshaft 14.

The first axle bearing 51b is disposed between the first hole portion 51a and the crankshaft 14. The first axle bearing 51b rotatably supports the crankshaft 14. In particular, the first axle bearing 51b rotatably supports one end of the crankshaft 14. For example, the first axle bearing 51*b* rotatably supports one end of the crankshaft 14 via the first rotation transmission member 16. For example, the first axle bearing 51*b* is configured as a ball bearing or a needle roller bearing.

The first cover portion 51 comprises a first fixing portion 51*c*. The first fixing portion 51*c* detachably fixes the first cover portion 51 to the main body portion 50. The first fixing portion 51*c* is provided to the outer peripheral part of the first cover portion 51. In particular, several first fixing portions 51*c* are provided at intervals on the outer peripheral part of the first cover portion 51. A first through-hole 51*d* is formed on each first fixing portion 51*c*.

Here, in the main body portion 50, a first fixed portion 50*b* is formed in the position that corresponds to the first fixing portion 51*c*. A first screw hole 50*c* is formed in the first fixed portion 50*b*. For example, a first bolt 151 passes through the first through-hole 51*d* of the first fixing portion 51*c* and screws into the first screw hole 50*c* of the first fixed portion 50*b*. With this, the first fixing portion 51*c* and the first fixed portion 50*b* are fixed. In this way, by forming the first screw hole 50*c* on the metallic main body portion 50, even when the first bolt 151 is repeatedly tightened and loosened when detaching the first cover portion 51, the first bolt 151 can be stably fixed.

Meanwhile, a seal member can be provided to the portion where the first cover portion 51 and the main body portion 50 are in contact. The seal member is formed from rubber or a flexible metal material.

The second cover portion 52 is made of synthetic resin. For example, the second cover portion 52 is formed of a synthetic resin comprising polyamide and/or glass fiber. The second cover portion 52 rotatably supports the crankshaft 14. The second cover portion 52 comprises a second hole portion 52*a* and a second axle bearing 52*b* (one example of a second axle bearing portion). The crankshaft is inserted into the second hole portion 52*a*. A power transmission unit 36, which is described below, is disposed between the second hole portion 52*a* and the crankshaft 14.

The second axle bearing 52*b* is disposed between the second hole portion 52*a* and the crankshaft 14. The second axle bearing 52*b* rotatably supports the other end of the crankshaft 14. For example, the second axle bearing 52*b* rotatably supports the other end of the crankshaft 14 via the power transmission unit 36. For example, the second axle bearing 52*b* is configured as a ball bearing or a needle roller bearing.

The second cover portion 52 comprises a second fixing portion 52*c*. The second fixing portion 52*c* detachably fixes the second cover portion 52 to the main body portion 50. The second fixing portion 52*c* is provided on the outer periphery of the second cover portion 52. In particular, several second fixing portions 52*c* are provided at intervals on the outer peripheral part of the second cover portion 52. A second through-hole 52*d* is formed on each second fixing portion 52*c*.

Here, in the main body portion 50, a second fixed portion 50*d* is formed in the position that corresponds to the second fixing portion 52*c*. A second screw hole 50*e* is formed in the second fixed portion 50*d*. For example, a second bolt 152 passes through the second through-hole 52*d* of the second fixing portion 52*c* and screws into the second screw hole 50*e* of the second fixed portion 50*d*. With this, the second fixing portion 52*c* and the first second fixed portion 50*d* are fixed. In this way, by forming the second screw hole 50*e* on the metallic main body portion 50, even when the second bolt 152 is repeatedly tightened and loosened when detaching the second cover portion 52, the second bolt 152 can be stably fixed.

Meanwhile, a seal member can be provided on the portion where the second cover portion 52 and the main body portion 50 are in contact. The seal member is formed from rubber or a flexible metal material.

The crankshaft 14 is a shaft member made of metal such as iron or stainless steel. As shown in FIG. 2, the two ends of the crankshaft 14 are disposed so that they each protrude from the first cover portion 51 (a first hole portion 51*a*) and second cover portion 52 (a second hole portion 52*a*).

The crankshaft 14 is rotatably supported on the housing 12 by the first axle bearing 51*b* and the second axle bearing 52*b*. In particular, the first rotation transmission member 16 is integrally and rotatably fixed to the crankshaft 14. One end of the crankshaft 14 is rotatably supported on the first cover portion 51 by the first axle bearing 51*b* via the first rotation transmission member 16. Additionally, the other end of the crankshaft 14 is rotatably supported on the second cover portion 52 by the second axle bearing 52*b* via a power transmission unit 36, which is described below.

The first crank arm 101*a* is fixedly attached to the end of the crankshaft 14 on the side with the first cover portion 51 such that the first crank arm 101*a* and the crankshaft 14 rotate together as a unit. The first crank arm 101*a* is preferably detachable with respect to the crankshaft 14. The second crank arm 101*b* is fixedly attached to the end of the crankshaft 14 on the side with the second cover portion 52 such that second crank arm 101*b* and the crankshaft 14 rotate together as a unit. The second crank arm 101*b* is preferably detachable with respect to the crankshaft 14.

The electric motor can transmit the rotation to the power transmission unit 36. For example, the electric motor 30 is an inner rotor-type motor. The electric motor 30 is provided in order to be in contact with the main body portion 50 of the housing 12. Specifically, the electric motor 30 is fixed while being in contact with the main body portion 50. In this way, by contacting and fixing the electric motor 30 to the main body portion 50, the heat of the electric motor 30 can be dissipated via the main body portion 50.

The electric motor 30 is disposed in the internal space S of the housing 12. The electric motor 30 is disposed between the first cover portion 51 and the second cover portion 52 in the direction along the crankshaft 14 (the axial direction). In particular, the electric motor 30 is disposed between the first cover portion 51 and the speed reduction mechanism 34 in the direction along the crankshaft 14.

The electric motor 30 comprises a motor case 30*a*, a rotor 30*b* and a stator 30*c*. The rotor 30*b* is rotatably supported by the motor case 30*a*. The rotor 30*b* is disposed on the outer peripheral part of the crankshaft 14. The rotor 30*b* is also disposed concentrically (coaxially) with the crankshaft 14. Additionally, several magnets, which are not shown, are provided in the outer peripheral part of the rotor 30*b*. The stator 30*c* is fixed to the inner peripheral part of the motor case 30*a*. The stator 30*c* is disposed opposing the rotor 30*b* on the outer peripheral side of the rotor 30*b*. The stator 30*c* comprises a plurality of coils that are not diagrammed.

The control board 33 is disposed in the internal space S of the housing 12. The control board 33 is provided to the main body portion 50 in the internal space S of the housing 12. Specifically, the control board 33 is fixed while being in contact with the main body portion 50 in the internal space S. Additionally, the control board 33 is provided to the main body portion 50 at a distance from the electric motor 30 in a direction away from the crankshaft 14 (the radial direction). The transmission mechanism 32 is disposed in between the control board 33 and the electric motor 30. That is, the control board 33 and the electric motor 30 are disposed in the internal space S of the housing 12 so that they are separated from each other via the transmission mechanism 32.

The control board 33 controls the electric motor 30. For example, the control board 33 mainly comprises a controller and an inverter that are not diagrammed. The controller controls the inverter. For example, the controller is programmed to control the inverter according to the pedaling force and the speed of the bicycle. The inverter drives the electric motor 30. As described above, the heat of the control board 33 can be dissipated via the main body portion 50 by contacting and fixing the control board 33 to the main body portion 50.

The transmission mechanism 32 is disposed in the internal space S of the housing 12. The transmission mechanism 32 is disposed in between the control board 33 and the electric motor 30. In particular, the transmission mechanism 32 is disposed in between the control board 33 and the electric motor 30 in a direction away from the crankshaft 14 (the radial direction).

Additionally, the transmission mechanism 32 is provided along the transmission path in between the crankshaft 14 and the power transmission unit 36. The transmission path is, for example as follows: "the first rotation transmission member 16→the second rotation transmission member 20→the third rotation transmission member 24→(the transmission mechanism 32)→the power transmission unit 36." The transmission mechanism 32 is supported by the first cover portion 51 and the second cover portion 52.

The transmission mechanism 32 comprises a gear shift motor unit 32a and a transmission mechanism main body 32b. The gear shift motor unit 32a is driven by an instruction from the rider in a gear changing operating unit that is mounted to the handle (which is not shown) and sets the transmission mechanism main body 32b to a prescribed gear ratio.

The transmission mechanism main body 32b is a transmission that can select a plurality of gear ratios (for example, eight). The transmission mechanism main body 32b is rotatably supported by the support shaft 22. The rotation of a third rotation transmission member 24 mentioned below is transmitted to the transmission mechanism main body 32b. The transmission mechanism main body 32b shifts the rotation that is transmitted from the third rotation transmission member 24 to a plurality of steps (for example, eight steps), including a direct connection. Additionally, after shifting, the transmission mechanism main body 32b outputs the rotation to the power transmission unit 36. In particular, a first gear member 76 is mounted to the transmission mechanism main body 32b. The rotation that is shifted in the transmission mechanism main body 32b is output to the power transmission unit 36 via the first gear member 76.

Here, the second rotation transmission member 20 and the third rotation transmission member 24 will be explained. The second rotation transmission member 20 is a member to which the rotation of the first rotation transmission member 16 is transmitted. The second rotation transmission member 20 is rotatably supported on the housing 12 and the electric motor 30. In particular, the second rotation transmission member 20 is rotatably supported on the first cover portion 51 of the housing 12 and the motor case 30a of the electric motor 30.

The third rotation transmission member 24 is a member to which the rotation of the second rotation transmission member 20 is transmitted. The third rotation transmission member 24 is rotatably supported on the support shaft 22. The rotation of the second rotation transmission member 20 is transmitted to the third rotation transmission member 24 by the second chain 28. The second chain 28 is wound around the second rotation transmission member 20 and the third rotation transmission member.

In this way, the second rotation transmission member 20 and the third rotation transmission member 24 transmit the rotation of the first rotation transmission member 16 to the transmission mechanism 32.

The speed reduction mechanism 34 is disposed in the internal space S of the housing 12. The speed reduction mechanism 34 reduces the output of the electric motor 30. In particular, the speed reduction mechanism 34 is disposed in between the electric motor 30 and the power transmission unit 36 in a direction along the crankshaft 14.

The speed reduction mechanism 34 decelerates the rotation of the electric motor 30 and transmits the rotation after deceleration to the power transmission unit 36. More specifically, the speed reduction mechanism 34 decelerates the rotation of the rotor 30b of the electric motor 30 and transmits the rotation after deceleration to the power transmission unit 36 via a torque transmitting member 70.

The speed reduction mechanism 34 is configured with one or more gears. For example, the speed reduction mechanism 34 comprises a first planetary gear mechanism 34a and a second planetary gear mechanism 34b. The first planetary gear mechanism 34a is coupled with the electric motor 30, for example, with the rotor 30b. The second planetary gear mechanism 34b is coupled with the first planetary gear mechanism 34a. The output of the second planetary gear mechanism 34b, that is, the output of the speed reduction mechanism 34, is transmitted to the power transmission unit 36 via the torque transmitting member 70. Meanwhile, the torque transmitting member 70 is rotatably supported on a second gear member 36b of the power transmission unit 36, which is described below.

The rotation of the crankshaft 14 and the rotation of the electric motor 30 are transmitted to the power transmission unit 36. Additionally, the power transmission unit 36 transmits the rotation of the crankshaft 14 and the rotation of the electric motor 30 to the front sprocket 38.

In particular, the power transmission unit 36 transmits the rotation of the crankshaft 14 to the front sprocket 38 via the first rotation transmission member 16, the second rotation transmission member 20, the third rotation transmission member 24, the transmission mechanism 32, and the first gear member 76. The power transmission unit 36 also transmits the rotation of the electric motor 30 to the front sprocket 38 via the speed reduction mechanism 34 and the torque transmitting member 70.

The power transmission unit 36 is provided coaxially with the crankshaft 14. The power transmission unit 36 is disposed in between the front sprocket 38 and the speed reduction mechanism 34 in a direction along the crankshaft 14 (the axial direction).

A third axle bearing 36a is disposed in between the power transmission unit 36 and the other end of the crankshaft 14. That is, the power transmission unit 36 is rotatably supported on the other end of the crankshaft 14 via the third axle bearing 36a. Also, the second axle bearing 52b is disposed in between the power transmission unit 36 and the second cover portion 52 of the housing 12. That is, the power transmission unit 36 is rotatably supported on the second cover portion 52 via the second axle bearing 52b.

In particular, the power transmission unit 36 comprises a second gear member 36b and a one-way clutch 36c. The second gear member 36b meshes with the first gear member 76 of the transmission mechanism 32. The second gear member 36b is rotatably supported on the second cover portion 52 of the housing 12 via the second axle bearing 52b. Additionally, the second gear member 36b rotatably supports the other end of the crankshaft 14 via the third axle bearing 36a. With this, the other end of the crankshaft 14 is rotatably supported on the second cover portion 52 of the housing 12 via the second gear member 36b. Meanwhile, for example, the third axle bearing 36a is configured as a ball bearing or a needle roller bearing.

The one-way clutch 36c transmits the rotation in only one direction of the electric motor 30 to the second gear member 36b. The rotation in one direction of the electric motor 30 is the rotation in the direction that drives the bicycle in the riding direction.

For example, the one-way clutch 36c is provided to the second gear member 36b. The one-way clutch 36c is disposed in between the second gear member 36b and the torque transmitting member 70. The one-way clutch 36c is integrally and rotatably coupled with the torque transmitting member 70. In this way, the one-way clutch 36c transmits the rotation in only one direction of the electric motor 30 to the second gear member 36b via the speed reduction mechanism 34 and the torque transmitting member 70.

The front sprocket 38 comprises an annular portion 38a that has sprocket teeth formed on the outer peripheral part and an annular portion 38b that is integrally formed on the inner peripheral part of the annular portion 38a. A tubular portion 38b is fixed to the power transmission unit 36. The fixing method for the front sprocket 38 can be an appropriate fixing method such as press fitting, caulking, screwing, gluing, or welding, etc.

Other Embodiments

While one embodiment has been chosen to illustrate the present invention, it will be apparent to those skilled in the art from this disclosure that various changes and modifications can be made herein without departing from the scope of the invention as defined in the appended claims. In particular, the various embodiments and modified examples described in the present specification can be freely combined according to necessity.

(a) In the above-described embodiment, an example was described in which the rotation of the crankshaft 14 is transmitted to the transmission mechanism 32 by three transmission members (the first rotation transmission member 16, the second rotation transmission member 20 and the third rotation transmission member 24). The configuration for transmitting the rotation of the crankshaft 14 to the transmission mechanism 32 is not limited to the above-described embodiment and can be any configuration.

(b) In the above-described embodiment, an example was described in which the first axle bearing 51b, the second axle bearing 52b, and the third axle bearing 36a are configured as a ball bearing or a needle roller bearing. The first axle bearing 51b, the second axle bearing 52b, and the third axle bearing 36a can be any kind of axle bearing as long as the member can be rotatably mounted. For example, at least one of the first axle bearing 51b, the second axle bearing 52b, or the third axle bearing 36a can be a rolling bearing, such as a roller bearing, or a slide bearing, such as a bushing.

(c) In the above-described embodiment, an example was described in which the main body portion 50 is a metallic member comprising, for example, an aluminum alloy. However, the main body portion 50 can be a metal other than an aluminum alloy, as long as this is a metallic member.

(d) In the above-described embodiment, an example was described in which the first cover portion 51 and the second cover portion 52 are synthetic resin members comprising polyamide and/or glass fiber. However, at least one of either the first cover portion 51 or the second cover portion 52 can be a different synthetic resin as long as this is a synthetic resin member.

The foregoing descriptions of selected embodiments according to the present invention are provided for illustration only, and not for the purpose of limiting the invention as defined by the appended claims and their equivalents.

What is claimed is:

1. A bicycle drive unit comprising:
   a crankshaft;
   a housing includes a synthetic resin first portion, a synthetic resin second portion and a metallic third portion, the synthetic resin first portion including a first axle bearing portion that rotatably supports a first end of the crankshaft, the synthetic resin second portion including a second axle bearing portion that rotatably supports a second end of the crankshaft, the metallic third portion disposed in between the synthetic resin first portion and the synthetic resin second portion, the metallic third portion defining an internal space of the housing along with the synthetic resin first portion and the synthetic resin second portion;
   an output unit coaxially disposed on the second end of the crankshaft and operatively coupled to the crankshaft to receive rotation of the crankshaft;
   an electric motor disposed in the internal space of the housing and being in contact with the metallic third portion, the electric motor further being operatively coupled to the output unit to transmit rotation of the electric motor to the output unit; and
   a control board disposed in the internal space of the housing and electrically coupled to the electric motor, the control board being mounted on the metallic third portion.

2. The bicycle drive unit as recited in claim 1, further comprising
   a speed reduction mechanism disposed in the internal space of the housing, and operatively coupled between the electric motor and the output unit to reduce an output of the electric motor to the output unit.

3. The bicycle drive unit as recited in claim 2, further comprising
   a transmission mechanism disposed in the internal space of the housing between the control board and the electric motor, and operatively coupling the crankshaft to the output unit to define a transmission path between the crankshaft and the output unit.

4. The bicycle drive unit as recited in claim 3, wherein
   the transmission mechanism is supported on the synthetic resin first portion and the synthetic resin second portion.

5. The bicycle drive unit as recited in claim 1, further comprising
   a transmission mechanism disposed in the internal space of the housing between the control board and the electric motor, and operatively coupling the crankshaft to the output unit to define a transmission path between the crankshaft and the output unit.

6. The bicycle drive unit as recited in claim 5, wherein the transmission mechanism is supported on the synthetic resin first portion and the synthetic resin second portion.

7. A bicycle drive unit comprising:

a crankshaft;

a housing includes a synthetic resin first portion, a synthetic resin second portion and a metallic third portion, the synthetic resin first portion including a first axle bearing portion that rotatably supports a first end of the crankshaft, the synthetic resin second portion including a second axle bearing portion that rotatably supports a second end of the crankshaft, the metallic third portion disposed in between the synthetic resin first portion and the synthetic resin second portion, the metallic third portion defining an internal space of the housing along with the synthetic resin first portion and the synthetic resin second portion;

an output unit coaxially disposed on the second end of the crankshaft and operatively coupled to the crankshaft to receive rotation of the crankshaft; and a control board disposed in the internal space of the housing and electrically coupled to an electric motor, the control board being mounted on the metallic third portion.

8. The bicycle drive unit as recited in claim 7, wherein the metallic third portion comprises an attaching portion that is configured to be attached to a frame of a bicycle.

9. The bicycle drive unit as recited in claim 7, wherein each of the synthetic resin first portion and the synthetic resin second portion comprises polyamide.

10. The bicycle drive unit as recited in claim 7, wherein each of the synthetic resin first portion and the synthetic resin second portion comprises glass fiber.

11. The bicycle drive unit as recited in claim 7, wherein the metallic third portion is an aluminum alloy.

* * * * *